No. 628,408. Patented July 4, 1899.
J. McC. LOPER.
THREAD PROTECTOR.
(Application filed Apr. 15, 1898.)
(No Model.)
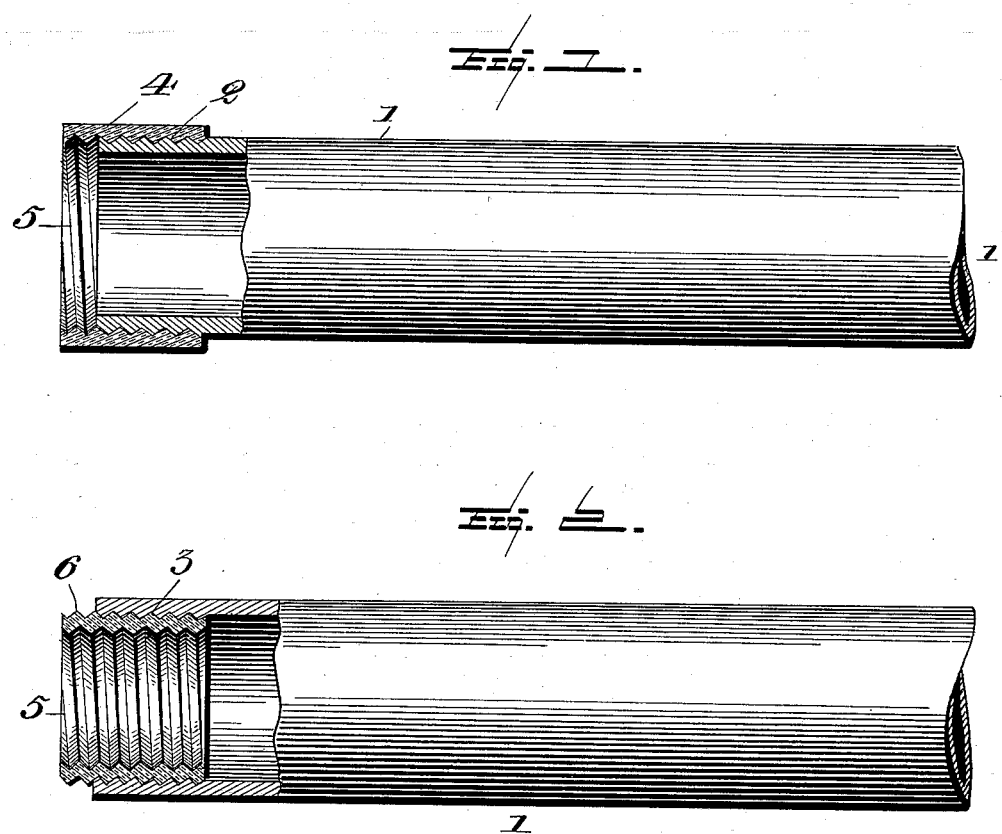
Witnesses:
L. C. Hills
N. L. Boyer
Inventor:
J. McC. Loper,
By N. C. Everitt Co.
Attys.

UNITED STATES PATENT OFFICE.

JONATHAN McC. LOPER, OF PITTSBURG, PENNSYLVANIA.

THREAD-PROTECTOR.

SPECIFICATION forming part of Letters Patent No. 628,408, dated July 4, 1899.

Application filed April 15, 1898. Serial No. 677,746. (No model.)

*To all whom it may concern:*

Be it known that I, JONATHAN McC. LOPER, a citizen of the United States of America, residing at Pittsburg, in the county of Allegheny and State of Pennsylvania, have invented certain new and useful Improvements in Thread-Protectors, of which the following is a specification, reference being had therein to the accompanying drawings.

This invention relates to certain new and useful improvements in thread-protectors; and it consists of a device for protecting threads of pipes, rods, or any threaded articles from mutilation or injury during transit or handling of the same.

The invention consists of a band or ring having a thread molded therewith and is adapted to be inserted either within or upon the screw-threaded end of the pipe or rod. This band or ring is or may be composed of flexible or pliable material, so that the band may be reversed or, in other words, turned inside out after being made so as to bring the molded threads either upon the outer or inner face of the band, as may be desired. The band may, however, be composed of a fibrous material, such as papier-mâché or the like, and which may be firmly secured within a metal band or ring, said fibrous band being of course provided with the molded threads on its exterior periphery. If desired, the edge of the band may be provided with an extending lug, the outer edge of which will be flush, or nearly so, with the inner periphery of the threaded band. This lug will serve to readily engage in the threads of the pipe or rod and serve to guide the band or ring more readily upon the same. In practice I cut these bands or rings into strips from a piece of material and chamfer, mortise, or otherwise work the ends, so that they will match neatly together, after which the band may be fastened by various means, as shown.

In the drawings, Figure 1 is a side view of a portion of the pipe, partly in section, showing my improved thread-protector thereon. Fig. 2 is a like view showing a thread-protector formed with molded threads on both of its faces.

Referring to the drawings by reference-figures, 1 denotes the pipe, which may be provided at the end with the exterior screw-threads 2, as shown in Fig. 1 of the drawings, or it may be provided with the interiorly-arranged screw-thread 3, as shown in Fig. 2 of the drawings.

The thread-protector consists of the band or ring 4, which is or may be composed of rubber, leather, papier-mâché, or any suitable material, and has formed on its interior face the threads 5, or this band may be made as shown in Fig. 2, wherein the threads 5 are provided on the interior face of the band and the outer face of same is provided with like threads 6. In case the band, as shown in Fig. 1, should be composed of rubber, leather, or other pliable material which would permit of the reversing of the band it will be observed that the same band as is shown in Fig. 1 is applied to the exterior threads could by reversing the band be made applicable to the protection of inner threads of a large-sized pipe, as the reversing of the band would place the threads upon the exterior surface thereof. In a band of the construction shown in Fig. 2 two sizes of pipe may be accommodated, the threads upon the exterior surface of the band engaging the inner threads of the pipe, while the threads upon the inner surface of the band would be employed for engaging the threads upon the exterior surface of a pipe smaller in diameter than that shown in Fig. 2. In practice I have preferably formed these threads by passing the strips of material through rolls specially devised to form the thread, so that the thread instead of being cut is molded on the band. This produces a much more durable thread, which will not be in any wise injured by the reversing of the band when the latter is formed of a suitable material.

One particular advantage in forming this thread-protector of pliable material—such as gum, leather, or the like—is that in manufacturing protectors a large quantity of strips may be cut and these passed through rolls to mold the thread thereon. After the thread is formed upon the strips they are formed into the band or ring, either with the thread upon the exterior or upon the interior face, as may be desired, according to the size of pipe upon which it is desired to use the protector.

Having fully described my invention, what I claim as new, and desire to secure by Letters Patent, is—

The device for protecting the screw-threaded ends of pipes, consisting of a circumferentially interiorly and exteriorly screw-threaded ring composed of pliable or flexible material which will permit the reversing of the same, substantially as shown and described.

In testimony whereof I affix my signature in the presence of two witnesses.

JONATHAN McC. LOPER.

Witnesses:
JOHN NOLAND,
E. W. ARTHUR.